Figure 1:
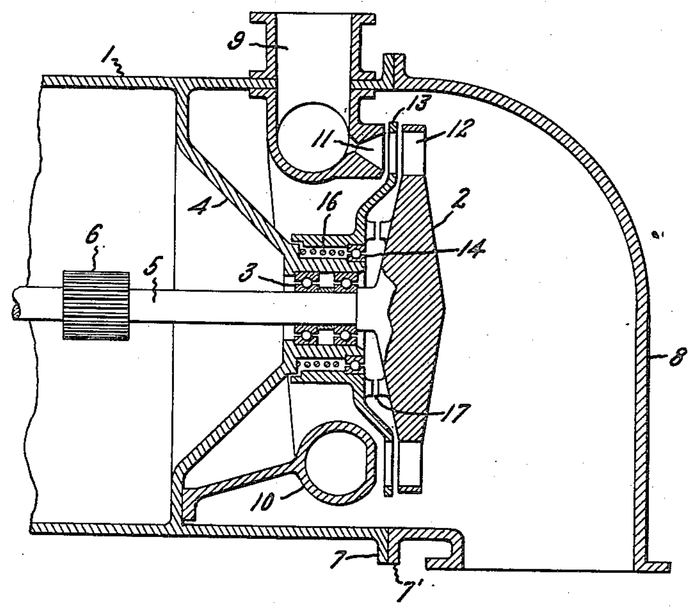

March 4, 1958

W. G. HOLT 2,825,531

SPEED LIMITING ARRANGEMENT

Filed July 1, 1954

Inventor:
Willard G. Holt by Edward M. Tuttle
His Attorney

United States Patent Office 2,825,531

Patented Mar. 4, 1958

2,825,531

SPEED LIMITING ARRANGEMENT

Willard G. Holt, Schenectady, N. Y., assignor to General Electric Company, a corporation of New York Application July 1, 1954, Serial No. 440,741

2 Claims. (Cl. 253—59)

This invention relates to fluid pressure turbines and, particularly, to speed limiting devices for turbines.

It is desirable and customary to provide motive fluid for driving turbine starters for internal combustion power plants from the combustion of a suitable fuel in a confined space so as to form gases under pressure. The invention may be used with turbine-type starter motors for gas turbine power plants and also for starting reciprocating engines since either of these types of power plants have moving parts of considerable mass and thus require the expenditure of considerable amounts of energy in order to effect starting. Usually a predetermined charge of fuel is ignited and the turbine wheel is subjected to the pressure of the gas generated until the charge has been dissipated. If, during the starting operation, the starter becomes disconnected from its load, as for example, due to the power plant accelerating under its own power rather early in the starting cycle, or due to failure of the driving mechanism, or for any reason whatever, it is necessary to provide quick-acting means for preventing overspeeding of the turbine-type starter to a dangerous degree. In practice, this is a very difficult problem to solve in view of the fact that the physical proportions of the turbine-type starter are usually such that its rotating parts have very little inertia. It is generally impractical to provide the rotating parts of the starter with sufficient inertia to prevent overspeeding of the starter, particularly in the case of aircraft applications, since this would require more space and weight than is usually permissible. Furthermore, with increased inertia of the starter rotor, a fuel charge of larger size would be required because of the larger mass to be accelerated to starting speed. Therefore, it will be apparent that any device employed to prevent overspeeding of such a turbine-type starter must be capable of acting within a very short time interval in view of the relatively low inertia of the rotating parts of the starting motor. Accordingly, it is an object of this invention to provide an improved speed limting arrangement which will prevent a turbine rotor from overspeeding.

Another object of this invention is to provide a novel arrangement which will prevent turbine-type starting motors from reaching an unsafe speed, which arrangement is mechanically simple, quick-acting, and light in weight.

A further object of the invention is to provide an improved means for interrupting the flow of gases in a turbine.

The objects of my invention may be realized through the provision of a nozzle control plate which is actuated by a windage torque.

Figure 2:
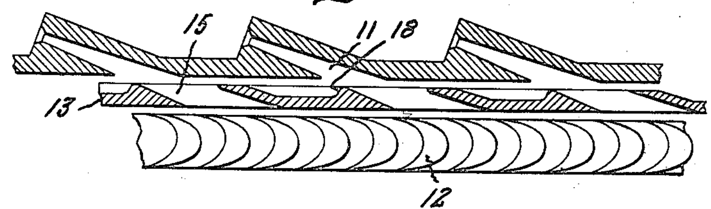
Figure 3:
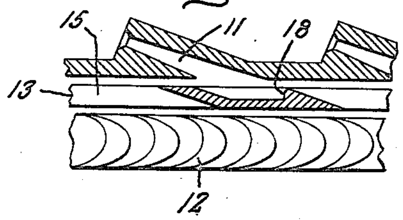

My invention will be better understood from the following description taken in connection with the accompanying drawing in which Figure 1 is a sectional view of a turbine type starter in accordance with the invention, Figure 2 is a sectional view of the nozzle control plate showing its normal relationship to the nozzles and turbine blades, and Figure 3 is a sectional view of the nozzle control plate showing its relationship to the nozzles and turbine blades in the blocked flow position.

Referring now to Figure 1, a main starter casing is illustrated at 1. A turbine rotor 2 is rotatably mounted in suitable bearings 3 which are supported from the main casing 1 by supporting members 4. A rotor shaft 5 may be formed integrally with the rotor 2 as shown or may be secured thereto by suitable key or spline means. A pinion 6 is secured to the rotor shaft 5 by suitable spline or key means and is adapted to mesh with one or more gears in a speed reduction gear train (not shown). The output of the gear train is connected to the engine or gas turbine to be started through a suitable clutch (not shown). For purposes of assembly and disassembly, the main casing 1 is provided with a flanged portion 7 for the attachment of an exhaust casing 8 having a mating flanged portion 7'.

Gases under pressure are supplied from a suitable source (not shown) through inlet 9 to a scrolled nozzlebox 10. From the nozzlebox 10, the gases expand through nozzles 11 and are directed against turbine blades 12 on the rotor 2. To restrict the flow of gases from the nozzles 11 through the turbine blades 12, an annular nozzle control plate 13 is provided which is rotatably mounted on a bearing 14. To provide further support for the nozzle control plate 13 and prevent subtsantial axial movement the rim of the plate may be made to co-operate with suitable rabbeted portions (not shown) provided in the casing 1. This kind of arrangement is described in greater detail in U. S. Patent 2,459,519, Graham. The plate 13 is provided with openings 15 which have an area corresponding to that of the nozzles 11. Openings 15 are so spaced that they will register with nozzles 11 in at least one position of plate 13. In normal operation the openings 15 are aligned to the nozzles 11 as shown in Figure 2 to form a clear path for the gases leaving the nozzles. The plate 13 is held in this position during normal operation by a helical spring 16 which has one end attached to the plate and the other fastened to the supporting member 4. Suitable stops (not shown) are provided to limit the angular movement of the plate 13.

Whenever the rotor 2 is in rotation, a rotary motion is imparted to the gases present between the rotor 2 and the plate 13. The motion of these gases against the plate 13 imparts a torque to the latter which is known as "windage torque." The windage torque increases as the square of the rotor speed so that a comparatively large change in the torque on the plate will result from a moderate change in speed. Small vanes 17 may be provided on the rotor 2 and/or the plate 13 to increase the windage torque if required. The spring 16 is oriented to oppose the windage torque on the plate and under normal running conditions biases the plate 13 to the normal open position.

In operation, motive fluid is supplied under pressure to the turbine nozzle 11. Plate 13 is arranged in cooperative alignment with nozzles 11 as previously indicated. This permits the motive fluid to pass first through nozzles 11, then through the openings 15 in the plate 13 and the turbine blades 12 and finally through the exhaust casing 8.

Assume now that, for any reason whatever, the rotor reaches an abnormal rotational speed. Since the windage torque exerted on the plate 13 increases with rotor speed, the increased torque will overcome the opposing force exerted by the spring 16 causing the plate to rotate. As the plate rotates, the openings 15 are shifted out of alignment with the nozzles 11 as shown in Figure 3, thereby blocking the flow path through the blading 12 and diverting the gases so that they flow around the rotor into the exhaust casing. The plate 13 has projections 18 which, when moved into the flow path, serve to augment the windage torque exerted on the plate. The force created by the flow of gases against the projections 18 will hold the plate 13 against the biasing force of the spring 16. When the flow of gases through the nozzles 11 ceases, the force exerted by the spring 16 will shift the plate back to its normal position. It will be obvious to those skilled in the art that by proper selection and design of the spring 16 and blades 18, the maximum speed of the unit may be set at any selected value.

While a particular embodiment of the invention has been illustrated and described, it will be obvious to those familiar with the art that various changes and modifications may be made without departing from the invention and it is intended to cover in the appended claims all such changes and modifications that come within the true spirit and scope of the invention.

What I claim as new and desire to secure by Letters Patent is:

1. In a turbine having a casing, a bladed rotor rotatably mounted in said casing, and nozzle means for directing motive fluid through said bladed rotor, speed limiting means comprising a movable member supported in said casing between said nozzle means and said rotor, means adapted to locate said member radially and axially while permitting limited angular movement relative to the nozzle means, said member defining at least one opening adapted to effect passage of motive fluid to the rotor in a first position and restrict passage of fluid in a second position, speed limiting means including at least one vane on the surface of said movable member adjacent said rotor and extending axially towards said rotor to increase the windage torque exerted on said member, and biasing means to bias said member to said first position said biasing means being yieldable in opposition to the windage torque exerted on said member when said torque exceeds a predetermined magnitude.

2. A turbine having a casing, a bladed rotor rotatably mounted in said casing, and nozzle means for directing motive fluid through said bladed rotor, speed limiting means comprising a movable member supported in said casing between said nozzle means and said rotor, means adapted to locate said member radially and axially while permitting limited angular movement relative to said nozzle means, said member defining at least one opening adapted to effect passage of motive fluid to the rotor in a first position and restrict passage of fluid in a second position, speed limiting means including at least one vane on the surface of said rotor adjacent said movable member and extending axially towards said movable member and at least one vane on said movable member adjacent said rotor and extending axially toward said rotor to increase the windage torque exerted on said member, and biasing means to bias said member to said first position, said biasing means being yieldable in opposition to the windage torque exerted on said member when said torque exceeds a predetermined magnitude.

References Cited in the file of this patent

UNITED STATES PATENTS

| | | |
|---|---|---|
| 330,753 | Trullinger | Nov. 17, 1885 |
| 801,345 | Svoboda | Oct. 10, 1905 |
| 1,170,547 | Kennedy | Feb. 8, 1916 |
| 2,569,898 | Millns | Oct. 2, 1951 |
| 2,651,493 | Volk | Sept. 8, 1953 |
| 2,733,891 | Millns et al. | Feb. 7, 1956 |